United States Patent

[11] 3,558,075

| [72] | Inventor | Robert W. Stoffel |
| | | Ferndale, Mich. |
| [21] | Appl. No. | 767,110 |
| [22] | Filed | Oct. 14, 1968 |
| [45] | Patented | Jan. 26, 1971 |
| [73] | Assignee | Jim Robbins Seat Belt Co. |
| | | Troy, Mich. |

[54] AUTOMATIC LOCKING RETRACTOR WITH SPIRAL CAM AND FRICTION CLUTCH
14 Claims, 9 Drawing Figs.

[52] U.S. Cl. ............................................. 242/107.4
[51] Int. Cl. ............................................... B65h 75/48
[50] Field of Search........................................ 242/107,
107SB, 107.4, 107.5, 107.6; 297/388; 280/150SB

[56] References Cited
UNITED STATES PATENTS

| 2,845,234 | 7/1958 | Cushman et al. | 242/107.4 |
| 3,100,609 | 8/1963 | Wrighton | 242/107.4 |
| 3,348,789 | 10/1967 | Hirsch | 242/107.4 |
| 3,412,952 | 11/1968 | Wohlert et al. | 242/107.4 |
| 3,446,454 | 5/1969 | Kovacs et al. | 242/107.4 |
| 3,450,368 | 6/1969 | Glauser et al. | 242/107.4 |

*Primary Examiner*—Stanley N. Gilreath
*Assistant Examiner*—Werner H. Schroeder
*Attorney*—Hauke, Krass, Gifford and Patalidis ABSTRACT: An automatic locking seat belt retractor is disclosed having a reel for retracting the belt, a pawl connected to the reel by a clutch such that the pawl is operative to lock the reel against rotation in the belt-unwinding direction, and a cam and follower arrangement for preventing the pawl from being moved to its locking position unless the reel has been rotated through a position in which a predetermined quantity of belt has been unwound.

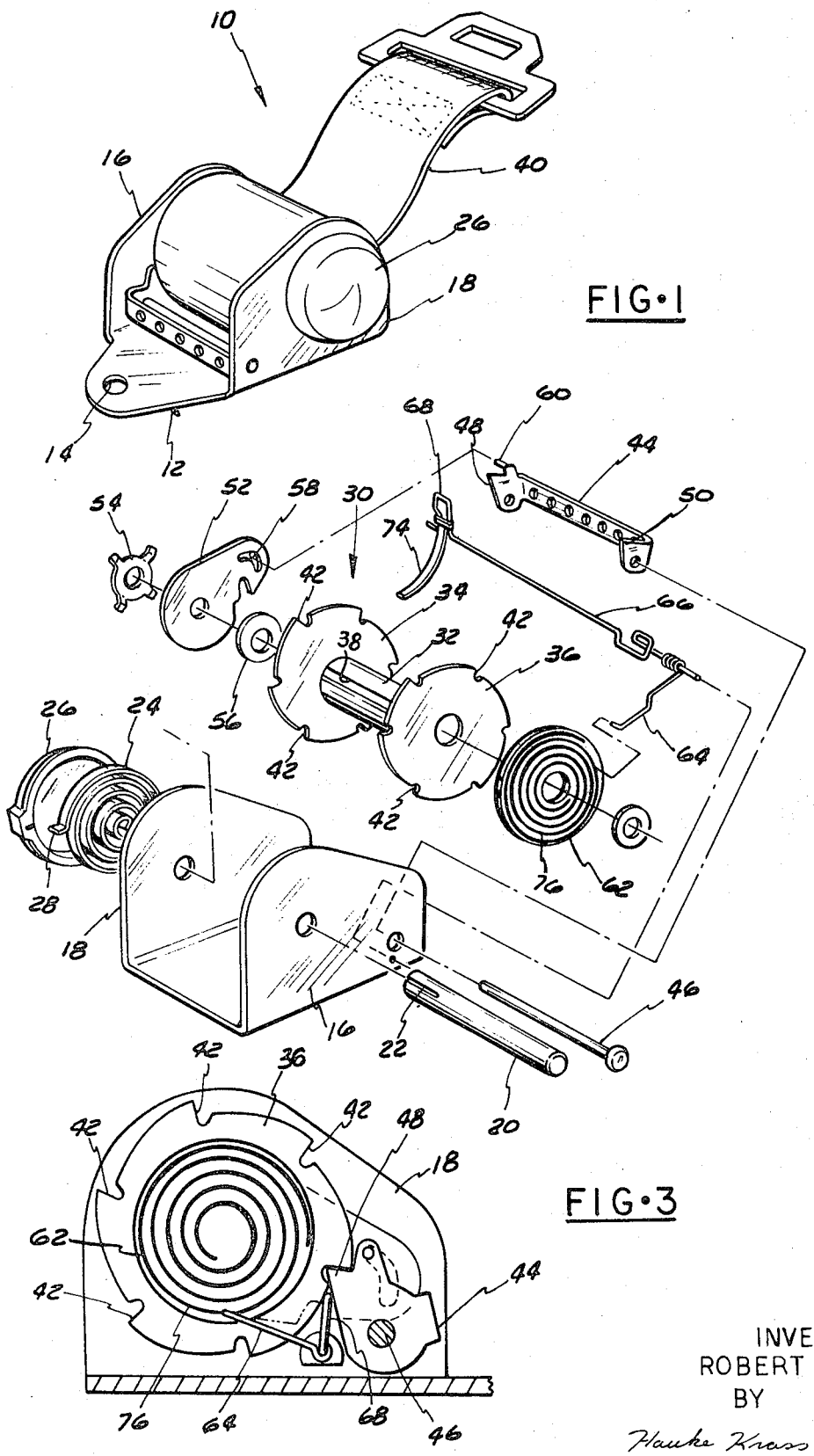

PATENTED JAN 26 1971 3,558,075
SHEET 2 OF 2
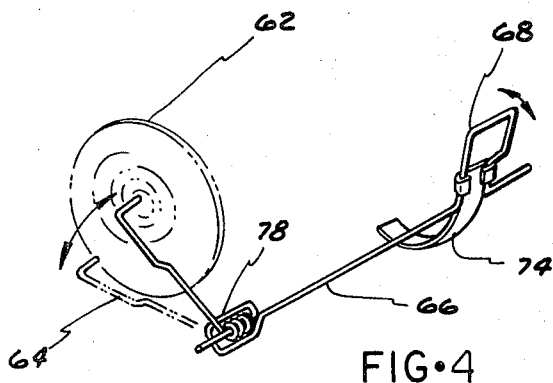
FIG·4
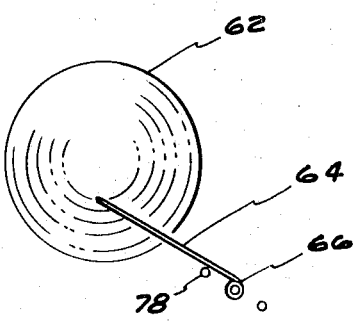
FIG·7
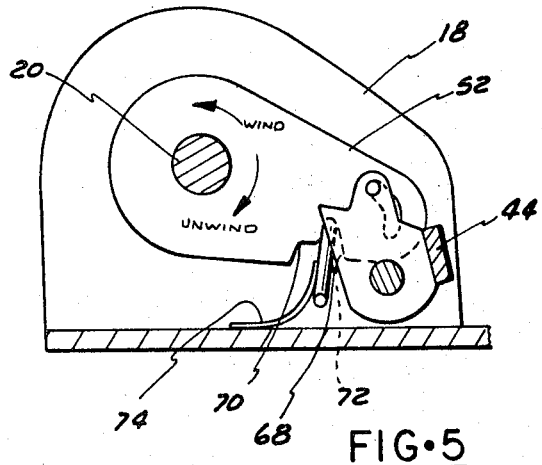
FIG·5
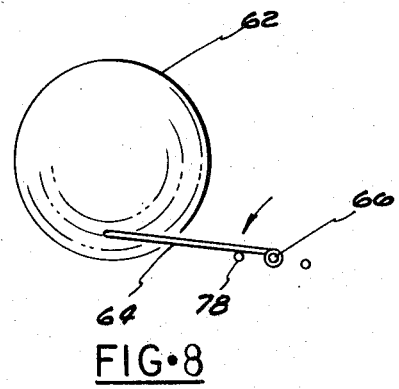
FIG·8
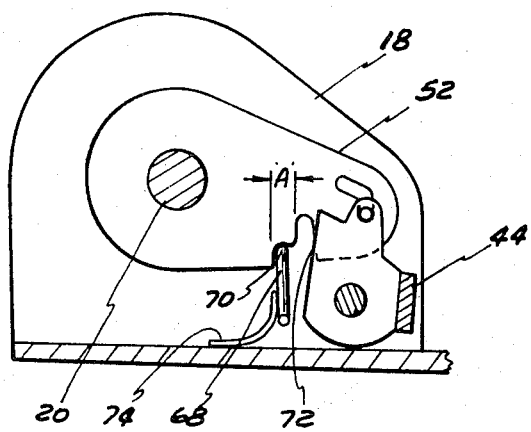
FIG·6
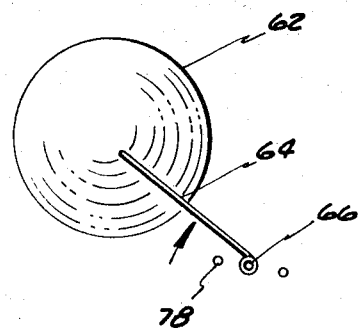
FIG·9
INVENTOR
ROBERT W. STOFFEL
BY
Hauke Kraus Gifford & Patalidis
ATTORNEYS

AUTOMATIC LOCKING RETRACTOR WITH SPIRAL CAM AND FRICTION CLUTCH

BACKGROUND OF THE INVENTION

This invention relates to automatic locking seat belt retractors and more particularly to a seat belt retractor having a rotatable reel for retracting the belt, a locking member for locking the reel against rotation in its unwinding direction, and a cam and follower arrangement for rendering the locking means inoperable whenever the reel is rotated between a first rotary position in which the belt is fully retracted, and a second rotary position in which less than a predetermined amount of the belt has been extended from the reel.

This invention is related to those types of seat belts retractors that allow the user to extend a selected quantity of the belt from the retractor and then prevent the belt from being further extended so that it provides an effective restraining element. The advantage of such retractors is that they automatically adjust the extended length of the belt according to the individual user's preference as opposed to those types of retractors in which the user must manually adjust the length of the belt. Such retractors of the prior art usually have a rotatable reel connected to the belt and biased toward rotation in a retracting direction to wind the belt into a roll. The reel allows the belt to be extended at such times as the reel can be rotated in its unwinding direction. A locking mechanism is employed for locking the reel against rotation in its unwinding direction when a selected length of the belt has been extended from the reel by the user.

Two problems have been encountered in such reels. One problem is related to the means for automatically triggering the locking mechanism so that it is moved from its unlocked to its locking position, and the second problem is related to the tendency of such locking mechanisms to prelock when only a small portion of the belt has been extended. As to the first problem, the prior art shows many patents in which the locking mechanism is triggered after the belt is initially extended from its fully retracted position, either by some form of time delay device or in response to a particular motion of the belt by the user. With respect to the second, prelocking problem, in addition to the time delay approach, the art shows various devices in which the locking mechanism is connected to a sensing arm that rides on the belt roll and prevents the locking mechanism from being actuated until the diameter of the roll has been reduced to a magnitude associated with a predetermined amount of the belt having been extended from the reel. Other approaches that do not depend on sensing the belt, generally have required rather complicated mechanisms that usually are not suited for mass production techniques.

SUMMARY

The preferred embodiment of the invention, which will be subsequently described in greater detail, comprises a belt reel journaled between a pair of walls on a support that is suited for attachment to a vehicle. The two walls are fixed with respect to one another with the reel being rotatable in either a belt-winding direction, or in a belt-unwinding direction. A seat belt is connected to the reel so that as the reel is rotated in its winding direction, the belt is retracted to a position in which it is wound on the reel. The belt can be extended from the reel at such times as it is rotatable in the unwinding direction.

A pair of circular ratchets are carried by the reel, and a pawl mounted on the support is movable toward a locking position in which it is engageable with the ratchets to prevent the reel from being rotated in the unwinding direction, and an unlocked position in which it is separated from the ratchets. The motion of the pawl is produced by a plate-like friction clutch member mounted on the reel adjacent one of the ratchets. As the reel is rotated, it urges the clutch toward rotation in the direction of motion of the reel. The clutch is connected to the pawl so that as the clutch is rotated by the reel in the unwinding direction it biases the pawl toward its locked position, and as the clutch is moved in the winding direction, it biases the pawl toward its unlocked position.

A cam, carried on the reel, has a spiral track with a center generally coinciding with the axis of the reel. A follower, engaged in the spiral track, is moved in one direction as the reel is rotated in the unwinding direction, and in the opposite direction as the reel is rotated in the winding direction. The follower is connected to the clutch in such a manner that when the follower is between a first position corresponding to the fully retracted position of the belt, and a second position corresponding to a position of the reel in which a predetermined amount of the belt has been extended, the clutch is prevented from moving the pawl from its unlocked to its locking position.

In summary, the motion of the reel is programmed such that the belt can be extended from its fully retracted position until a predetermined amount of the belt, such as 12 inches, before the locking pawl can be moved to its locking position. The belt can be further extended by the user until a selected length has been unwound from the reel. A partial retraction of the reel then causes the locking pawl to engage the ratchets so that the pawl is operable to lock the reel from further rotation in the unwinding direction.

It is therefore an object of the present invention to provide an automatic locking retractor having a locking mechanism programmed by a cam to operate independently of the position or the amount of belt that is on the reel.

It is another object of the invention to provide an automatic locking retractor in which the locking mechanism is programmed so that the reel can be rotated in the unwinding direction through a first angular interval in which the locking mechanism is inoperable to prevent the reel from being rotated, and through another angular interval in which the locking mechanism is operable to prevent the reel from being rotated in the unwinding direction.

It is still another object of the invention to provide an automatic locking reel that allows a selected portion of the belt to be extended from the reel with a locking mechanism that allows the extended length of the belt to be readjusted without the belt having to be retracted toward its fully retracted position.

Still further objects and advantages of the present invention will be readily apparent to those skilled in the art to which the invention pertains, upon reference to the following detailed description.

DESCRIPTION OF THE DRAWINGS

The description refers to the accompanying drawings in which like reference characters refer to like parts throughout the several views and in which:

FIG. 1 is a perspective view showing an automatic locking seat belt retractor illustrating the preferred embodiment of the invention;

FIG. 2 is an exploded view of the retractor of FIG. 1;

FIG. 3 is an elevational view showing the pawl in its locking position;

FIG. 4 is a view showing the cam, the follower and the stop member for controlling the motion of the clutch;

FIG. 5 is a view showing the clutch and the pawl in their locking position;

FIG. 6 shows the clutch and the pawl in their unlocked position; and

FIGS. 7, 8 and 9 are schematic illustrations showing the follower in its various operative positions.

DESCRIPTION OF THE PREFERRED EMBODIMENTS

Now referring to FIGS. 1 and 2, a preferred seat belt system 10 comprises a generally channel-shaped support 12 having a base formed with an aperture 14 for attaching the support 12 to a vehicle, and a pair of spaced, parallel sidewalls 16 and 18. The sidewalls 16 and 18 are fixed with respect to one another.

A shaft 20 is rotatably journaled on the sidewalls 16 and 18. One end of the shaft 20 has a slot 22 engaged with the inner end of a spiral windup spring 24 mounted adjacent the outer side of the wall 18. A housing 26 is mounted on the wall 18 and connected to the outer end 28 of the spring 24 so that as the shaft is rotated in its unwinding direction, the spring 24 becomes tensioned so that it biases the shaft 20 in the opposite winding direction.

A reel, generally indicated at 30, is mounted on the shaft 20 between the walls 16 and 18 and comprises a cylindrical member 32 having its ends connected to a pair of circular ratchets 34 and 36. The cylindrical member has a slot 38 that extends between the two ratchets and is adapted to receive the end of an elongated seat belt 40. Belt 40 is connected to the reel by having its end inserted through the slot 38, around the shaft 20, and then out through the slot to a position where it is stitched to itself to form a permanent loop. The belt could also be attached to the reel by other suitable means.

The two ratchets 34 and 36 are fixed to the shaft 20 by any suitable means so that the reel 30 rotates with the shaft in both its winding and unwinding directions.

Each of the ratchets 34 and 36 has a plurality of teeth 42 supported in an annular arrangement about the axis of rotation of the reel. A pawl 44 is mounted on the support walls 16 and 18 by a pin 46 that allows the pawl to be pivoted about an axis that is parallel to the axis of rotation of the reel. The pawl 44 has a tooth 48 that is engageable with the teeth of the ratchet 34, and a tooth 50 that is engageable with the teeth of the ratchet 36. The pawl 44 is movable on the pin 46 between an unlocked position, illustrated in FIG. 6, in which the teeth 48 and 50 are separated from the ratchets 34 and 36 so that the pawl is not operable to prevent rotation of the reel, and a locking position, illustrated in FIG. 5, in which the teeth 48 and 50 are engaged with the ratchets 34 and 36, respectively, and are operable to prevent the reel from being rotated in the unwinding direction.

A clutch 52, mounted between the ratchet 34 and the wall 18, provides a connection with the reel for moving the pawl 44 between its unlocked and locking positions. The clutch 52 is formed of a plate-like section of plastic material and is mounted on the shaft 20 so that it can be rotated with respect to the reel 30. A spring 54, mounted between the clutch 52 and the wall 18, biases the clutch toward the ratchet 34. An annular friction element 56 disposed between the clutch 52 and the ratchet 34 provides a connection between the clutch and the reel so that as the reel is rotated in either its winding or unwinding directions, it biases the clutch in the same direction of rotation.

The clutch 52 extends toward the pawl 44 and has a slot 58 receiving a pin 60 carried by the pawl. The pin 60 and the slot 58 provide a connection between the clutch and the pawl such that as the clutch is rotated in one direction, the pin approaches one end of the slot, and as the clutch is rotated in the opposite direction, the pin approaches the opposite end of the slot. As the clutch is rotated by the reel in the winding direction, it biases the pawl 44 away from the ratchets and toward its unlocked position. Similarly as the clutch is rotated by the reel in the opposite, unwinding direction, the clutch biases the pawl toward the ratchets and its locking position.

Whenever the clutch 52 is biased by the reel in the winding direction, it is operable to bias the pawl 44 toward its unlocked position. However, at such times as the reel biases the clutch in the unwinding direction, a cam 62, a follower 64 and a stop member 66 cooperate to either prevent or allow the clutch to move the pawl toward its locking position, depending on the rotary position of the reel.

The stop 66 is preferably formed of an elongated piece of wire having its ends journaled in the walls 16 and 18 of the support so that it can be pivoted about its longitudinal axis. The stop 66 is bent to form an arm 68 that abuts the inner side of the wall 18 thereby limiting axial displacement of the stop 66 toward the wall 18. The arm 68 is engaged in a cutout section of the clutch which may be considered to be composed of a step 70 and a slot 72 as can best be seen in FIGS. 5 and 6.

The arm 68 is movable between a release position illustrated in FIG. 5 in which it is disposed in the slot 72, and a stop position illustrated in FIG. 6 in which the arm 68 is in abutment with the step 70. When the arm is disposed in the slot 72, the clutch has sufficient freedom of movement to move the pawl 44 between its unlocked and locking positions because it can be moved between its extreme rotary positions by the reel. The arm 68 can move toward its stop position, illustrated in FIG. 6, only at such times as the clutch 52 has been rotated in the winding direction to move the pawl to its unlocked position. It this stop position of the arm 68, it prevents the clutch from being rotated in the unwind position, thereby preventing the pawl from being moved from its unlocked to its locking position.

A leaf spring 74 having one end connected to the arm 68 and its other end in abutment with the base of the support 12 biases the arm 68 toward its release position. The position assumed by the stop 66 is dependent on the relative positions of the follower 64 and the cam 62. The cam 62 is carried on the ratchet 36 so that it rotates with the reel. The cam 62 has a generally planar surface facing the support wall 16, and is formed with a spiral groove or track 76 that has a center generally substantially coinciding with the axis of rotation of the reel.

The follower 64 is also preferably formed of a section of relatively rigid wire, with one end engaged in the groove 76 and its other end rotatably mounted on the stop 66. The stop 66 is bent to form an arm 78 which forms an abutment for the follower 64.

Referring to FIGS. 7, 8 and 9, for a description of the operation of the cam and follower arrangement, it is to be understood that the track 76 has a greater number of revolutions than are necessary to rotate the reel between its position in which the belt 40 is fully retracted, and its position in which the belt 40 is fully extended so that the follower never engages either end of the spiral track.

Assuming the belt 40 is substantially fully extended from the reel, the pawl 44 is in its locking position, the follower 64 and the arm 78 would be in relative positions illustrated in FIG. 7. As the belt is allowed to be retracted under the influence of the windup spring 24, the reel is rotated in the winding direction so that the cam also is rotated in the winding or counterclockwise direction. As the cam 62 is rotated, the end of the follower engaged in the track 76 is moved by the track away from the axis of rotation of the reel until it establishes an abutment with the arm 78 so that continued rotation of the reel in the winding direction causes the follower 64 to rotate the stop in the counterclockwise direction as viewed in FIG. 7. The stop is thus moved from its release position toward its stop position.

Since the clutch 52 is free to move the pawl 44 toward its unlocked position while the stop is in its release position, the clutch is moved by the reel to its position illustrated in FIG. 6. This motion of the clutch allows the arm 68 freedom to leave the slot 72 and move into engagement with the step 70. The position at which the arm 68 engages the step is associated with a predetermined rotary position of the reel in which a predetermined portion of the belt has been either extended from the reel or retracted on the reel. The step 70 is formed to allow the follower 64 to be moved by the cam until the belt is in its fully retracted position. This position of the follower cam 62 is illustrated in the FIG. 8. In the fully retracted position of the reel, the follower is engaged with the arm 78 of the stop and prevents the stop from being rotated toward its release position so that the clutch is inoperable to move the locking pawl 44 from its unlocked to its locking position.

As the belt is extended from its fully retracted position, the reel is rotated in its unwind direction with the follower 64 being rotated about the stop 66 by the cam in the clockwise direction as viewed in FIG. 9. As the follower 64 is rotated, it becomes separated from the arm 78 until the stop has freedom of motion to be rotated from its stop position toward its release position. The step 70 of the clutch is formed such that the stop cannot be moved by the spring 74 toward its release position as long as the clutch member 52 is in the position illustrated in FIG. 6 in which it is holding the pawl 44 in its unlocked position. Continued extension of the belt causes the reel 30 to rotate in the unwinding direction to a predetermined rotary position in which the follower has been rotated a sufficient distance to allow the arm 78 sufficient freedom of motion so that it can be moved to the slot 72, that is to a position in which it does not prevent rotation of the clutch. This predetermined position of the reel preferably corresponds to a position in which about 12 inches of the belt has been extended from the reel when the support is mounted on the floor of an automotive vehicle. It can be seen that this predetermined rotary position of the reel with respect to the position of the reel when the belt is fully retracted can be controlled by varying the dimension A of the step illustrated in FIG. 6.

The advantage of providing an angular interval of the reel 30 in which the clutch 52 is disabled from moving the pawl 44 insures that the locking pawl 44 cannot be moved to its locking position until a significant portion of the belt has been extended from the reel 30.

When a selected portion of the belt, greater than the predetermined portion, has been extended from the reel so that the follower has been moved to a position where the arm 68 cannot interfere with the rotation of the clutch, a slight rotation of the reel in the winding direction under the influence of spring 24 is operable to move the clutch 52 a sufficient distance in the winding direction to release the arm 68 so that it can be moved toward its release position by the spring 74. With the stop arm 68 in its release position, a subsequent rotation of the reel in the unwind direction also rotates the clutch in its unwind direction which in turn moves the pawl 44 from its unlocked to its locking position. Thus it can be seen that when a selected portion of the belt, which is greater than the predetermined portion, has been extended from the reel by the user, and then slightly retracted the clutch is in a position to move the locking pawl 44 into engagement with the ratchets upon a subsequent extension of the belt.

To readjust the extended length of the belt, the user can either retract the belt to a shorter length, or allow the belt to be retracted so that the reel is rotated in the winding direction until the follower 64 moves the arm 78 of the stop until the arm 68 of the stop is again engaged with the step 70 of the clutch member. The belt can then be extended to a greater length because the locking pawl, in its unlocked position, cannot be moved by the clutch to its locking position until the belt is again slightly retracted to allow the spring 74 to return the stop arm 68 to its release position. Thus it can be seen that the extended length of the belt can be readjusted without having to fully retract the belt on the reel.

It is to be understood that I have described a novel automatic locking retractor which is relatively compact because of the flat clutch and cam members, and in which the novel cam construction prevents the locking pawl from being "prelocked" before a significant portion of the belt has been extended from the reel. A further advantage of the preferred locking retractor is that it can be operated entirely independently of whether or not the belt is connected to the reel. In addition, the preferred retractor is reliable, composed of a relatively few components that are suited for economical manufacturing process, and provides a quiet operation.

I claim:
1. A safety seat belt system, comprising:
   a. an elongated safety seat belt;
   b. a support;
   c. a reel rotatably journaled on the support, and connected to the belt to retract the belt as the reel is rotated in a first, winding direction, and to allow the belt to be extended as the reel is rotated in the opposite, unwinding direction;
   d. bias means for urging the reel in its winding direction;
   e. a locking member mounted on the support for motion between a locking position in which it is operable to prevent the reel from being rotated in its winding direction, and an unlocked position in which it is inoperable to prevent the reel from being rotated;
   f. a clutch member rotatably mounted on the support, connected to the reel so that rotation of the reel urges the clutch to rotate, and connected to the locking member to urge the locking member either toward its locking position as the reel is rotated in its unwinding direction, or toward its unlocked position as the reel is rotated in its winding direction; and
   g. a stop member mounted on the support for motion between a stop position in which it is operative to prevent rotation of the clutch member with the reel, and a release position in which it is inoperable to prevent rotation of the clutch member with the reel, means connecting said stop member to the reel independently of said belt for urging said stop member toward its stop position whenever the reel is rotated in its winding direction and for urging said stop member toward its release position as the reel is rotated in the unwinding direction, through any position beyond a predetermined rotary position of the reel in which a predetermined amount of the belt has been extended from the reel.

2. A seat belt system as defined in claim 1 wherein said last mentioned means includes:
   a. a cam rotatably mounted on the support, and connected to the reel so as to be rotated in a first direction as the reel is rotated in its winding direction, to be rotated in the opposite, second direction as the reel is rotated in its unwinding direction;
   b. a follower engaged with the cam, and connected to the stop member to urge the stop member toward its stop position as the reel is rotated in its winding direction, said follower being urged by the cam, as the reel is rotated in the unwinding direction, toward a first position in which the follower prevents the stop member from having sufficient freedom to move toward its release position as the reel is rotated toward its predetermined rotary position, and a second position in which it allows the stop sufficient freedom to move toward its release position as the reel is rotated away from its predetermined rotary position; and
   c. second bias means operable to move the stop member toward its release position from its stop position as such time as the stop member has sufficient freedom to move toward its release position.

3. A safety seat belt system as defined in claim 2, in which the clutch member is engageable with the stop member in the stop position to prevent the stop member from being moved to its release position by the second bias means unless the reel is rotated in the winding direction from a position in which the reel has been rotated in the unwinding direction away from said predetermined rotary position.

4. A safety seat belt system as defined in claim 2, in which the cam has a spiral track with a center substantially coinciding with the axis of rotation of the reel; and the follower is engaged with the spiral track so as to be moved between a first pair of positions as the reel is rotated between a first rotary position in which the belt is fully retracted, and said predetermined rotary position, and a second pair of positions as the reel is rotated between said predetermined rotary position and a second rotary position in which the belt is fully extended; and the stop member is connected to the follower such that as the reel is rotated in the unwinding direction, the stop member cannot be moved from its stop position when the follower is between its first paid of positions, and is movable from its stop position to its release position when the follower is between its second pair of positions.

5. A safety seat belt system, comprising:
   a. an elongated safety seat belt;
   b. a support having a pair of spaced walls fixed with respect to one another in parallel relationship;
   c. a reel rotatably journaled on the wall, and connected to the belt to retract the belt toward a retracted position between the opposed sides of the two walls as the reel is rotated in a first, winding direction and to allow the belt to be extended as the reel is rotated in the opposite, unwinding direction;

d. a ratchet carried by the reel, said ratchet having a plurality of teeth supported in an annular array about the axis of rotation of the reel;

e. a pawl mounted on the support for motion between a locking position in which it is engageable with the ratchet to prevent rotation of the reel in its unwinding direction, and an unlocked position in which it is inoperable to prevent rotation of the reel;

f. a clutch member formed of a plate-like section, and mounted on the reel between the retracted position of the belt and one of the support walls, said clutch member being connected to the reel such that rotation of the reel urges the clutch member toward rotation, and connected to the pawl to urge the pawl either toward its locking position as the reel is rotated in its unwinding direction or toward its unlocked position as the reel is rotated in its winding direction;

g. a cam mounted on the reel between the retracted position of the belt and one of the support walls, said cam having a spiral track supported with its center substantially coinciding with the axis of rotation of the reel, and being connected to the reel to rotate with the reel; and h. a follower engaged in the spiral track of the cam so as to be moved in a first direction toward a first position as the cam is rotated with the reel in the winding direction, and to be moved in the opposite direction toward a second position as the cam is rotated with the reel in the unwinding direction, said follower being connected to the clutch to prevent the clutch from being rotated with the reel as the cam is rotated through a first predetermined angular interval as the belt is being extended, and to allow the clutch to be rotated by the reel as the cam is rotated through the second predetermined angular interval as the belt is being extended.

6. The safety seat belt system as defined in claim 5, in which the first predetermined angular interval of the cam is defined by a first rotary position in which the belt is fully retracted, and the second rotary position in which a predetermined amount of the belt has been extended from the reel.

7. A safety seat belt system as defined in claim 5, in which the first predetermined angular interval of the cam is defined by a first rotary position of the cam in which the belt is fully retracted on the reel and a second rotary position in which a predetermined amount of belt is retracted on the reel.

8. A safety seat belt system as defined in claim 5, in which the clutch is frictionally connected to the ratchet such that the ratchet urges the clutch toward rotation as the reel is rotated.

9. A safety seat belt system as defined in claim 8, including a second ratchet carried on the reel, spaced along the axis of rotation of the reel with respect to the first mentioned ratchet; and wherein the cam is mounted on the second ratchet.

10. A retracting reel assembly comprising:
support means;
reel means rotatably supported by said support means;
an elongated flexible element connected to said reel means and adapted to be wound thereon and unwound therefrom;
locking means movable between locked and unlocked positions for respectively preventing and allowing rotation of said reel means;
clutch means movable to and from a first position for preventing said locking means from moving to said locked position; and
means for controlling movement of said clutch means including a cam rotatable about an axis in response to rotation of said reel means and cam follower means engaged with said cam to be moved thereby and engageable with said clutch means.

11. An assembly as set forth in claim 10 wherein:
said cam is coaxial with said reel means and includes a cam track with a spiral portion extending radially about said axis;
said follower means includes a follower disposed in said track; and
a stop member engageable with said clutch means and means interconnecting said stop member and said follower to move said stop member in response to radial movement of said follower.

12. An assembly as set forth in claim 11 wherein said clutch means includes a clutch plate coaxial with and frictionally driven by said reel means.

13. An assembly as set forth in claim 12 wherein said clutch plate includes a step and an adjacent slot so that said stop member may engage said step to maintain said clutch plate in said first position and may move into said slot to allow said clutch plate to move from said first position whereby said locking means may move to said locked position.

14. As assembly as set forth in claim 13 wherein said stop member includes a leaf spring attached to said support means.